US012792672B2

(12) United States Patent
Juma et al.

(10) Patent No.: US 12,792,672 B2
(45) Date of Patent: Nov. 10, 2026

(54) ENHANCING RETRIEVAL AUGMENTED GENERATION (RAG) FOR A LARGE LANGUAGE MODEL USING CONTEXTUAL DATA

(71) Applicant: Red Hat, Inc., Raleigh, NC (US)

(72) Inventors: Farah Juma, Toronto (CA); Stefano Maestri, Milan (IT)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 19/175,355

(22) Filed: Apr. 10, 2025

(65) Prior Publication Data

US 2026/0320133 A1 Oct. 15, 2026

(51) Int. Cl.

*G06F 16/00* (2019.01)
*G06F 16/93* (2019.01)
*G06N 3/08* (2023.01)

(52) U.S. Cl.

CPC ............... *G06F 16/93* (2019.01); *G06N 3/08* (2013.01)

(58) Field of Classification Search

None
See application file for complete search history.

(56) References Cited

U.S. PATENT DOCUMENTS 12,517,941 B1* 1/2026 Kihm ...................... G06F 16/35
12,566,782 B1* 3/2026 Verrier .................. G06F 16/285
2026/0003897 A1* 1/2026 Yurick ................ G06F 16/3329
2026/0064702 A1* 3/2026 Seovic ................ G06F 16/2462
2026/0064722 A1* 3/2026 Verrier .................. G06F 16/285
2026/0065088 A1* 3/2026 Knight ................ G06F 16/2462

OTHER PUBLICATIONS

Kukreja, Sanjay, Tarun Kumar, Vishal Bharate, Amit Purohit, Abhijit Dasgupta, and Debashis Guha. "Performance evaluation of vector embeddings with retrieval-augmented generation." In 2024 9th international conference on computer and communication systems (ICCCS), pp. 333-340. IEEE, 2024. (Year: 2024).*

Collini, Enrico, Felix Indra Kurniadi, Paolo Nesi, and Gianni Pantaleo. "Context-aware retrieval augmented generation using similarity validation to handle context inconsistencies in large language models." IEEE Access (2025). (Year: 2025).*

(Continued)

*Primary Examiner* — Farhan M Syed
(74) *Attorney, Agent, or Firm* — Kilpatrick Townsend & Stockton LLP

(57) ABSTRACT

A retrieval augmented generation (RAG) process for a large language model (LLM) can be enhanced using contextual data. For example, a system can transform a query into a query embedding and generate weighted similarity scores for chunk embeddings stored in a database. Each weighted similarity score can be generated based on the query embedding, the chunk embedding, and at least one contextual data embedding. The system can select at least one of the chunk embeddings based on the weighted similarity scores. The at least one chunk embedding corresponds to at least one chunk of at least one text document. The system can then retrieve the at least one text document from a document database, generate an input for a LLM that includes the at least one text document and the query, and execute the LLM based on the input to generate a response to the query.

20 Claims, 4 Drawing Sheets

(56) References Cited

OTHER PUBLICATIONS

Jiang, Pengcheng, Siru Ouyang, Yizhu Jiao, Ming Zhong, Runchu Tian, and Jiawei Han. "Retrieval and structuring augmented generation with large language models." In Proceedings of the 31st ACM SIGKDD Conference on Knowledge Discovery and Data Mining V. 2, pp. 6032-6042. 2025. (Year: 2025).*

Aung, N.N., et al., 2024, September. Demand Forecasting: Integrating Textual and Market Data to Navigate Irregular Market Disruption. In Proceedings of the 2024 3rd International Conference on Algorithms, Data Mining, and Information Technology (pp. 270-280). (Year: 2024).*

* cited by examiner

ENHANCING RETRIEVAL AUGMENTED GENERATION (RAG) FOR A LARGE LANGUAGE MODEL USING CONTEXTUAL DATA

TECHNICAL FIELD

The present disclosure relates generally to machine learning. More specifically, but not by way of limitation, this disclosure relates to enhancing retrieval augmented generation (RAG) for a large language model (LLM) using contextual data to improve the accuracy of query results.

BACKGROUND

Large Language Models (LLMs) are machine-learning systems trained on large amounts of textual data to understand and respond to natural language queries. These models use deep learning architectures to analyze context, semantics, and syntax, enabling them to perform tasks ranging from text generation to complex reasoning. Retrieval Augmented Generation (RAG) is a technique that enhances the capabilities of LLMs by integrating external data retrieval mechanisms. RAG combines the generative capabilities of LLMs with real-time access to structured or unstructured information from external sources, enabling more accurate and diverse responses. This hybrid approach addresses limitations in static model knowledge and ensures dynamic adaptability, making it especially useful for applications requiring up-to-date information or domain-specific expertise.

DETAILED DESCRIPTION

Figure 1:
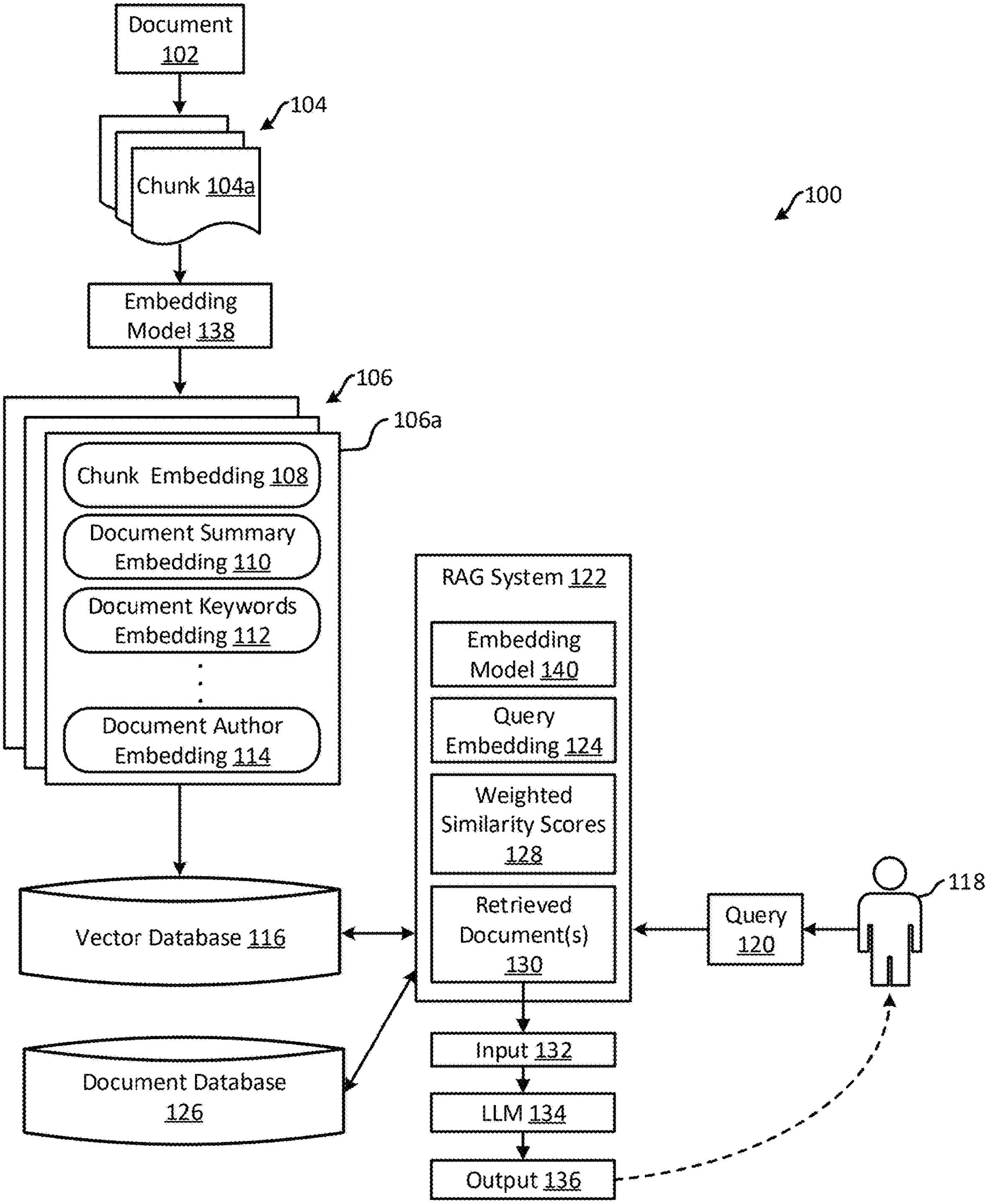
FIG. 1 shows a block diagram of an example of a process for enhancing RAG for a LLM using contextual data according to some aspects of the present disclosure.

Retrieval Augmented Generation (RAG) is a technique that has become increasingly popular for enhancing the capabilities of LLMs. In conventional RAG systems, text documents are segmented into smaller portions referred to as chunks. In this context, the term "document" is not intended to be limited to document formats and may encompass any unit of textual information, such as e-mails, news articles, social media posts, articles, blog posts, academic papers, etc. Each text chunk is converted into a vector representation, referred to as a "chunk embedding," which is subsequently stored in a vector database. This process is repeated across thousands or even millions of documents. When a user submits a query to be processed by a large language model (LLM), the RAG system first converts the query into a vector representation referred to as a "query embedding." The system then compares the query embedding against the stored chunk embeddings in the vector database to identify the chunk embedding that is most similar to the query embedding. Once the most-similar chunk embedding is identified, the RAG system retrieves the full text document containing the associated chunk. The RAG system then provides that full text document as part of input to the LLM, which generates a response to the user's query based on the input.

A significant technical problem with the above conventional approach is its focus on individual text chunks. While a specific chunk in a text document may be highly relevant to the user's query, the remainder of the document may be irrelevant. Because the similarity comparison in RAG systems is performed solely between the query embedding and individual chunk embeddings, the system may incorrectly flag an entire document as relevant based on the presence of one relevant chunk. Consequently, when the full document is used as input to the large language model (LLM), the resulting output may be suboptimal. For example, the output may inaccurate or fail to adequately address the user's query.

Some examples of the present disclosure can overcome one or more of the abovementioned problems by incorporating contextual data into the RAG process to enhance document retrieval accuracy. Instead of relying solely on chunk embeddings for similarity comparisons, the RAG system also stores embeddings of contextual data associated with each chunk in the vector database. Examples of the contextual data may include a summary of the document containing the chunk, relevant keywords in the document, the document's title, the document's authors, and/or other types of metadata about the document. When a user submits a query, the RAG system can convert the query into a query embedding. Using the query embedding, the RAG system can generate a weighted similarity score associated with each chunk based on both its chunk embedding and its related contextual data embeddings. The RAG system can then rank the chunks by their weighted similarity scores to identify the top-X most relevant chunks, where X is a preselected numerical value that may be 1 or greater. The RAG system can retrieve one or more documents containing the top-X most relevant chunks and provide them as part of the input to the LLM, which generates a response to the query based on the input. By incorporating contextual data beyond the chunk itself, the RAG system performs a more holistic assessment of document relevance than conventional approaches. This improves the quality of the input to the LLM, which in turn improves the quality of the downstream query responses generated by the LLM.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a process for enhancing RAG for a LLM 134 using contextual data according to some aspects of the present disclosure. The process can begin with a system 100 receiving a text document 102. The system 100 can divide the text document 102 into multiple chunks 104. For example, the system 100 may divide the text document 102 into 10, 50, or 100 chunks of the same size. A single chunk may have a certain number of characters, sentences, paragraphs, etc.

The system 100 can next generate database entries 106 for the chunks 104. The system 100 can generate a respective database entry 106 for each individual chunk 104. The database entry 106*a* for a given chunk 104*a* can include an embedding of the chunk 104*a*, referred to as a chunk embedding 108. An "embedding" is a numerical representation of data in a vectorized format. The database entry 106*a* can also include at least one contextual data embedding. A contextual data embedding is an embedding of contextual data related to the document 102. In some examples, the system 100 can execute an embedding model 138 to generate the chunk embedding 108 and the contextual data embeddings.

As shown in FIG. 1, the database entry 106*a* can include various types of contextual data embeddings. For instance, the database entry 106*a* may include a document summary embedding 110. A document summary embedding 110 is an embedding of a summary of the document 102. The summary can be in natural language format—e.g., a sentence or series of sentences in a human readable language. The summary can be shorter in length than the document. The system 100 may generate the summary using natural language processing (NLP) techniques, for example by executing a summarizer model.

Additionally or alternatively, the database entry 106*a* may include a keyword embedding 112. A keyword embedding 112 is an embedding of a list of one or more keywords in the document 102. The list of keywords is not in a natural language format, rather, the list of keywords may be an array or vector of said keywords. The system 100 may generate the list of keywords using NLP techniques, for example by executing a keyword model.

Additionally or alternatively, the database entry 106*a* may include an author embedding 114. An author embedding 114 is an embedding of the one or more names of one or more authors of the document 102. The system 100 may automatically determine the authors by analyzing the document 102 for author details or by communicating with a source of the document 102, such as a webpage that may list the author details.

The database entry 106*a* may additionally or alternatively include embeddings of other kinds of contextual data, such as an abstract of the document 102, an intent of the document 102, a concept or theme of the document 102, a table of contents of the document 102, categories and/or subcategories associated with the document 102, named entities in the document 102, sentiment associated with the document 102, tags assigned to the document 102 (e.g., automatically by a machine-learning model performing NLP), captions associated with the document 102, a location of the document within a filesystem (e.g., the path to the document) 102, a uniform resource locator (URL) associated with the document 102, a source of the document 102, a type of the document 102 (e.g., blog post, book excerpt, or academic paper), a date created or a date modified for the document 102, a bibliography associated with the document 102, a comment about the document 102 (e.g., a social media comment) from a third party, a traceback link associated with the document 102, or any combination of these. The system 100 may determine some or all of the above types of contextual data and/or receive it from one or more external sources. For example, the system 100 may execute one or more machine-learning models (e.g., a sentiment model) to determine the sentiment expressed in the document 102, a topic of the document 102, and an intent of the document 102. Other details about the document 102, such as its creation date or last modified date, may be included in the document 102 itself as metadata. It will be appreciated that any number and combination of contextual data may be used in various examples.

As noted above, the system 100 can generate an entry 106*a* for a chunk 104*a*, where the entry 106*a* includes the chunk embedding 108 and any number of the contextual data embeddings. The system 100 can then store the entry 106*a* in the vector database 116. The system 100 can repeat this process for some or all the chunks 104 of the document 102. Because the chunks 104 are all related to the same document 102, it may be unnecessary to repeatedly store the same contextual data embeddings in each of the entries 106, which would be duplicative and waste memory. Rather, in some examples, the contextual data embeddings may be stored a single time in the vector database 116, and each of the entries 106 may have references (e.g., pointers) to the locations of the contextual data embeddings in the vector database 116.

The system 100 can repeat the above process for thousands or millions of documents to construct the vector database 116. Once constructed, the vector database 116 can be used in a RAG process, as described below.

The RAG process can begin when a user 118 submits a query 120 to the system 100. The query 120 can be intended for the LLM 134. The query 120 can be received by a RAG system 122, which can transform the query 120 into a query embedding 124. The system 100 can generate the query embedding 124 using an embedding model 140, which may be the same as the embedding model 138.

Based on the query embedding 124, the RAG system 122 can generate weighted similarity scores 128 associated with some or all of the entries 106 in the vector database 116. For instance, referring to entry 106*a* of FIG. 1, the RAG system 122 can generate a first similarity score between the query embedding 124 and the chunk embedding 108. The RAG system 122 can also generate a second similarity score between the query embedding 124 and a document summary embedding 110 associated with the chunk embedding 108. RAG system 122 can also generate a third similarity score between the query embedding 124 and a document keyword embedding 112 associated with the chunk embedding 108. The RAG system 122 can also generate a fourth similarity score between the query embedding 124 and a document author embedding 114 associated with the chunk embedding 108. These similarity scores may be, for example, cosine distances or Euclidean distances. The RAG system 122 can then generate a weighted sum of the first, second, third, and fourth similarity scores. In the weighted sum, some or all of the weights may be different from one another. This can produce a final score for the entry 106*a* (e.g., its corresponding chunk). For example, the RAG system 122 may generate a weighted similarity score 128 for entry 106*a* as follows:

$$Z = aC + bS + cK + dA$$

where Z is the final weighted similarity score for the entry 106*a*; a, b, c, and d are respective weights; C is the first similarity score; S is the second similarity score; K is the third similarity score; and A is the fourth similarity score. This process can be repeated for some or all of the entries 106 in the vector database 116 to generate the weighted similarity scores 128.

It will be appreciated that the above example for computing a weighted similarity score 128 is intended to be illustrative and non-limiting. Other examples may use more or fewer similarity scores, which in turn can be determined based on more, less, or a different combination of contextual data embeddings. Additionally, other examples may use algorithms other than a weighted summation to generate a weighted similarity score 128. For instance, a weighted average may be used instead.

Based on the weighted similarity scores 128, the RAG system 122 can determine one or more documents that are most relevant to the query 120. For example, the RAG system 122 can rank the weighted similarity scores 128 from highest to lowest. The RAG system 122 can then identify the top-X chunk embeddings (e.g., the top 1 or the top 5 highest-scoring chunk embeddings) as the most-relevant chunk embeddings. After identifying the most-relevant chunk embeddings, the RAG system 122 can retrieve the one or more documents 130 containing the corresponding chunks from a document database 126, which may be different from the vector database 116. The retrieved document(s) 130 can be considered the most relevant documents to the query 120.

Based on the one or more retrieved documents 130, the system 100 can generate an input 132 for the LLM 134. For example, the input 132 can include the content of some or all of the retrieved documents 130 and the query 120. The input 132 may serve as an input prompt for the LLM 134. The system 100 can provide the input 132 to the LLM 134, which can generate an output 136 based on the input 132. The output 136 can serve as a response to the query 120. The system 100 can then provide the output 136 to the user 118, as indicated by the dashed arrow in FIG. 1.

In the above process, the documents 130 that form the input 132 to the LLM 134 are chosen not only based on the chunks they contain but also based on the other contextual data. This is a more holistic analysis that can yield more accurate downstream results from the LLM 134 than conventional techniques, which focus solely on the individual chunks.

Figure 2:
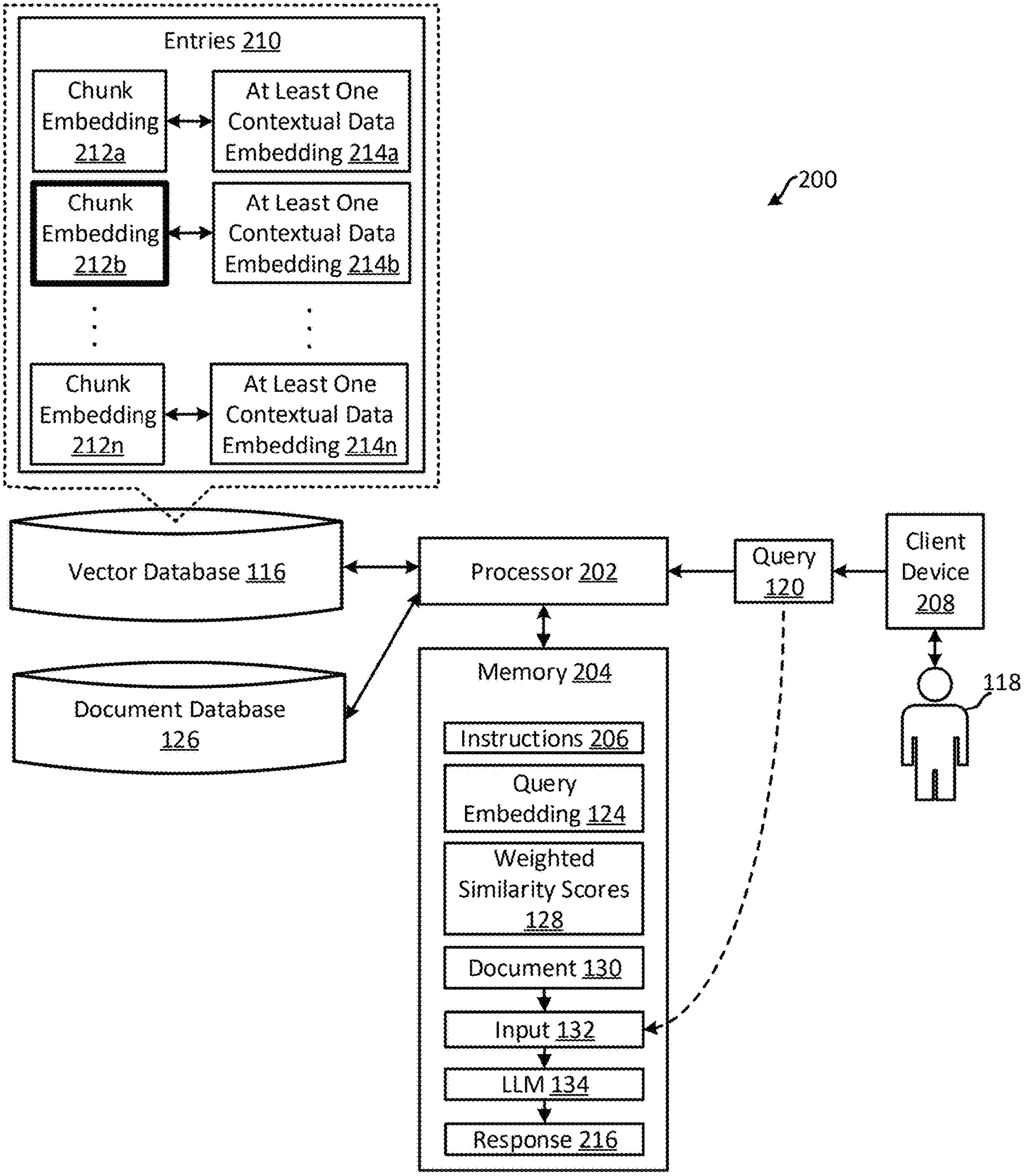
FIG. 2 shows a block diagram of an example of a system for enhancing RAG for a LLM using contextual data according to some aspects of the present disclosure.

Turning now to FIG. 2, shown is a block diagram of an example of a system 200 for enhancing RAG for a LLM 134 using contextual data according to some aspects of the present disclosure. The system 200 includes a processor 202 communicatively coupled to a memory 204. In some examples, the processor 202 and memory 204 may be located in the same physical device, such as a server. In other examples, the processor 202 and memory 204 may be located in different physical devices (e.g., distributed from one another) and communicatively coupled to one another.

The processor 202 can include one processing device or multiple processing devices. Non-limiting examples of the processor 202 include a Field-Programmable Gate Array (FPGA), an application-specific integrated circuit (ASIC), a microprocessor, or any combination of these. The processor 202 can execute instructions 206 stored in the memory 204 to perform operations, such as any of the operations described above with respect to FIG. 1. In some examples, the instructions 206 can include processor-specific instructions generated by a compiler or an interpreter from code written in any suitable computer-programming language, such as C, C++, C#, Python, or Java.

The memory 204 can include one memory device or multiple memory devices. The memory 204 can be volatile or non-volatile, such that the memory 204 retains stored information when powered off. Non-limiting examples of the memory 204 include electrically erasable and programmable read-only memory (EEPROM), flash memory, or any other type of non-volatile memory. At least some of the memory device can include a non-transitory computer-readable medium from which the processor 202 can read the instructions 206. A computer-readable medium can include electronic, optical, magnetic, or other storage devices capable of providing the processor 202 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 206.

In some examples, the processor 202 can execute the instructions 206 to perform one or more operations. For example, the processor 202 can receive a query 120 from a client device 208 of a user 118. Examples of the client device 208 can include a laptop computer, desktop computer, tablet, e-reader, mobile phone, wearable device such as a smart watch, or server. The processor 202 can transform the query 120 into a query embedding 124. Based on the query embedding 124, the processor 202 can generate weighted similarity scores 128 for a group of chunk embeddings 212*a-n* stored in a vector database 116. A weighted similarity score 128 for a particular chunk embedding 212*a* can be generated based on the query embedding 124, the particular chunk embedding 212*a*, and at least one contextual data embedding 214*a* associated with the particular chunk embedding. For example, each weighted similarity score 128 can be generated by comparing the query embedding 124 to a chunk embedding (e.g., chunk embedding 212*a*) of the group of chunk embeddings 212*a-n* and by comparing the query embedding 124 to at least one contextual data embedding (e.g., contextual data embedding 214*a*) associated with the chunk embedding in the vector database 116. The processor 202 can select at least one chunk embedding 212*b* from among the plurality of chunk embeddings 212 based on the weighted similarity scores 128, where the at least one chunk embedding 212*b* corresponds to at least one chunk of at least one text document 130. The processor 202 can then retrieve the at least one text document 130 from a document database 126, generate an input 132 for the LLM 134 that includes the at least one text document 130 and the query 120 (as represented by the dashed arrow), and execute the LLM 134 based on the input 132 to generate a response 216 to the query 120. The processor 202 may then transmit the response 216 to the client device 208 of the user 118.

In some examples, the processor 202 can rank the weighted similarity scores 128 to determine the top-X most-relevant chunk embeddings in relation to the query embedding 124. The processor 202 can then retrieve one or more text documents 130 associated with the top-X most-relevant chunk embeddings from the document database 126, generate an input 132 for the LLM 134 that includes the one or more text documents 130 and the query 120 (as represented by the dashed arrow), and execute the LLM 134 based on the input 132 to generate a response 216 to the query 120.

Figure 3:
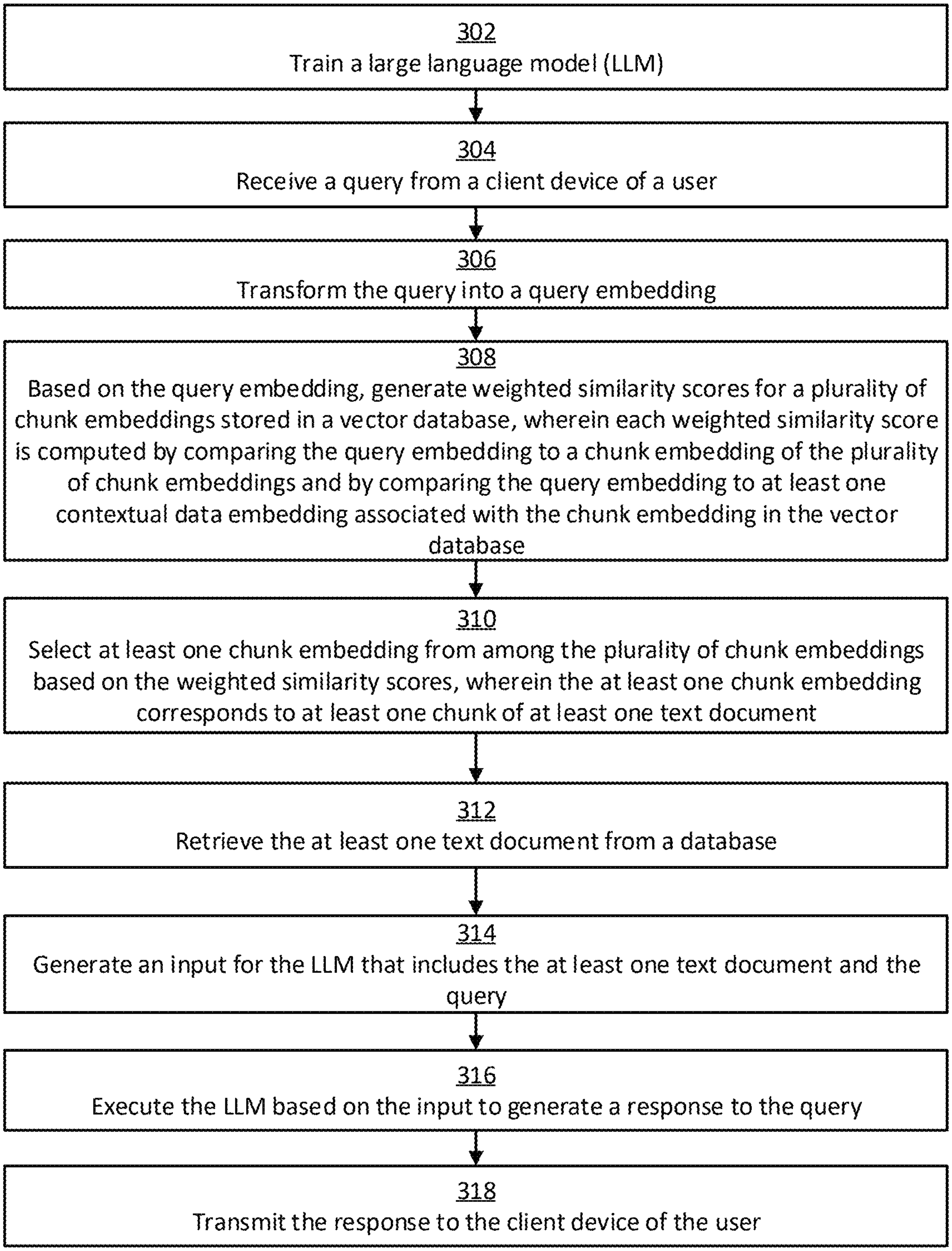
FIG. 3 shows a flowchart of an example of a process for enhancing RAG for a LLM using contextual data according to some aspects of the present disclosure.

Turning now to FIG. 3, shown is a flowchart of an example of a process for enhancing RAG for a LLM using contextual data according to some aspects of the present disclosure. Other examples may include more operations, fewer operations, different operations, or a different sequence of operations than is shown in FIG. 3. The operations of FIG. 3 are described below with reference to the components of FIG. 2 described above.

In block 302, the processor 202 trains a large language model (LLM) to transform it from an untrained state to a trained state. This may be achieved by performing a supervised training process and/or an unsupervised training process using a large set of training data, which may include millions or billions of text documents.

The LLM 134 may include a neural network, such as a feedforward neural network. The neural network can include an input layer, an output layer, and one or more hidden layers between the input layer and the output layer. Each of the layers can include a respective set of nodes whose weights can be tuned during the training process.

In block 304, the processor 202 receives a query 120 (e.g., for a LLM 134) from a client device 208 of a user 118. The processor 202 can receive the query 120 from the client device 208 via one or more networks, such as the Internet. In some examples, the query 120 can be a question, such as "how does light bend when it passes from air to water?".

In block 306, the processor 202 transforms the query 120 into a query embedding 124. The processor 202 can transform content into its corresponding embedding using an embedding model. Examples of such an embedding model can include text-embedding-3-large by OpenAI®, Word2Vec, Global Vectors for Word Representation (GloVe), Bidirectional Encoder Representations from Transformers (BERT), or UAE-Large-V1. In some examples, the embedding model can include a neural network that accepts content as input and provides a corresponding embedding as output.

In block 308, based on the query embedding 124, the processor 202 generates weighted similarity scores 128 for a group of chunk embeddings 212*a-n* stored in a vector database 116. Each weighted similarity score 128 may be generated by comparing the query embedding 124 to a chunk embedding (e.g., chunk embedding 212*a*) of the group of chunk embeddings 212*a-n* and by comparing the query embedding 124 to at least one contextual data embedding (e.g., contextual data embedding 214*a*) associated with the chunk embedding in the vector database 116. For example, the processor 202 may generate a first similarity score by comparing the query embedding 124 to a chunk embedding 212*a*. The first similarity score can represent the similarity between the query embedding 124 and the chunk embedding 212*a*. The first similarity score may be a Euclidean distance or a cosine distance between the query embedding 124 and the chunk embedding 212*a*. The processor 202 may also generate a second similarity score by comparing the query embedding 124 to a contextual data embedding 214*a*. The second similarity score can represent the similarity between the query embedding 124 and the contextual data embedding 214*a*. The second similarity score may be a Euclidean distance or a cosine distance between the query embedding 124 and the contextual data embedding 214*a*. The processor 202 can then generate a weighted similarity score 128 based on the first similarity score and the second similarity score, for example by performing a weighted summation of the two scores. In the weighted summation, the weights applied to the first and second similarity scores may be the same as or different from one another.

In block 310, the processor 202 selects at least one chunk embedding 212*b* from among the plurality of chunk embeddings 212 based on the weighted similarity scores 128. The at least one chunk embedding 212*b* can correspond to at least one chunk of at least one text document 130. In some examples, the processor 202 may select the at least one chunk embedding 212*b* because it has the highest weighted similarity score as compared to the other chunk embeddings.

In block 312, the processor 202 retrieves the at least one text document 130 from a document database 126. The document database 126 can be different from the vector database 116. The document database 126 may contain thousands or millions of text documents.

In block 314, the processor 202 generates an input 132 for the LLM 134 that includes the at least one text document 130 and the query 120. For example, the content of the at least one text document 130 and the content of the query 120 may be combined into a single input prompt for the LLM 134.

In block 316, the processor 202 executes the LLM 134 based on the input 132 to generate a response 216 to the query 120. The LLM 134 can provide the response 216 as an output. The response 216 can be in a natural language format.

In block 318, the processor 202 transmits the response 216 to the client device 208 of the user 118. For example, the processor 202 can transmit the response 216 to the client device 208 via the one or more networks.

Figure 4:
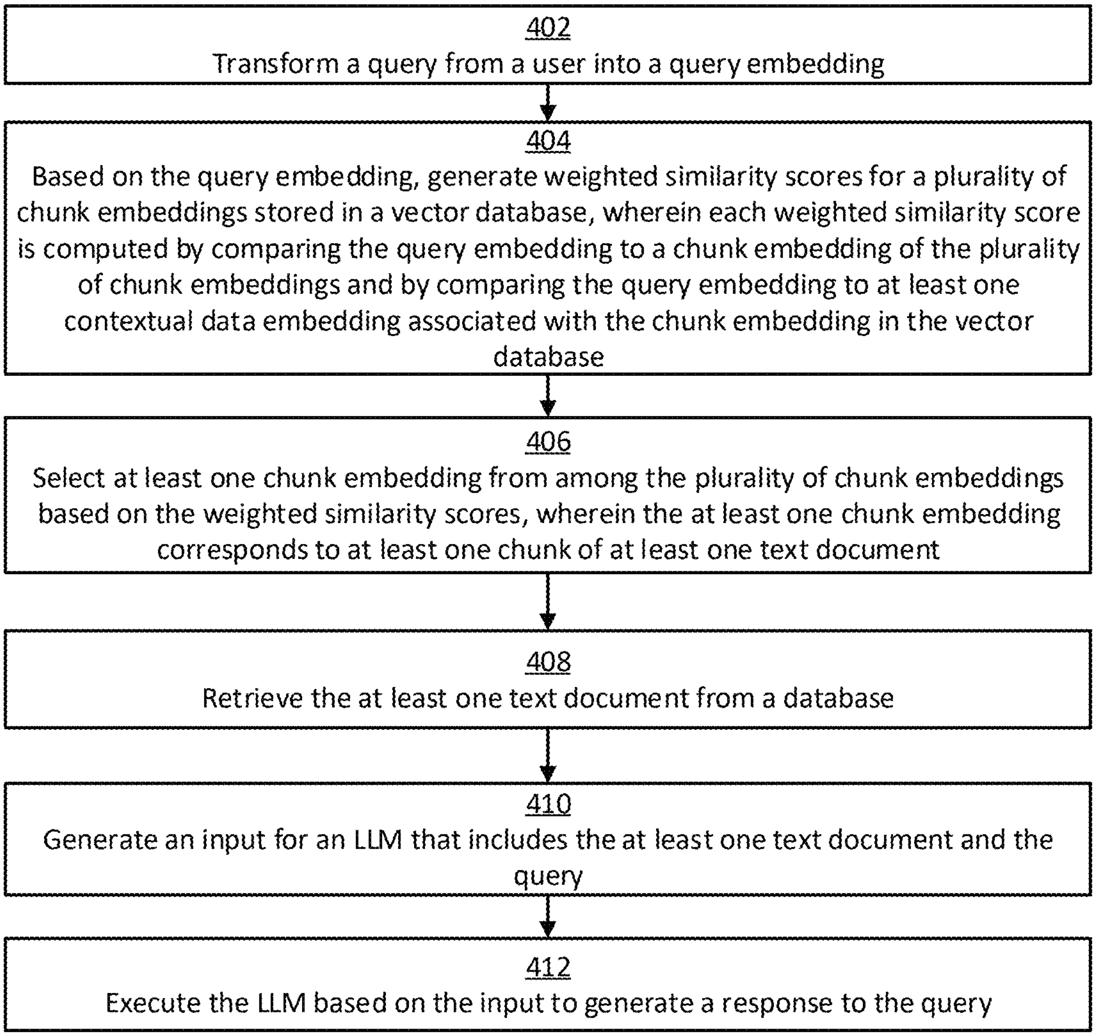
FIG. 4 shows a flowchart of another example of a process for enhancing RAG for a LLM using contextual data according to some aspects of the present disclosure.

FIG. 4 shows a flowchart of another example of a process for enhancing RAG for a LLM using contextual data according to some aspects of the present disclosure. Other examples may include more operations, fewer operations, different operations, or a different sequence of operations than is shown in FIG. 4. The operations of FIG. 4 are described below with reference to the components of FIG. 2 described above.

In block 402, the processor 202 transforms a query 120 from a user 118 into a query embedding 124. This operation can be performed similarly to block 306 of FIG. 3.

In block 404, based on the query embedding 124, the processor 202 generates weighted similarity scores 128 for a group of chunk embeddings 212*a-n* stored in a vector database 116. This operation can be performed similarly to block 308 of FIG. 3.

In block 406, the processor 202 selects at least one chunk embedding 212*b* from among the plurality of chunk embeddings 212 based on the weighted similarity scores 128. This operation can be performed similarly to block 310 of FIG. 3.

In block 408, the processor 202 retrieves the at least one text document 130 from a document database 126. This operation can be performed similarly to block 312 of FIG. 3.

In block 410, the processor 202 generates an input 132 for an LLM 134 that includes the at least one text document 130 and the query 120. This operation can be performed similarly to block 314 of FIG. 3.

In block 412, the processor 202 executes the LLM 134 based on the input 132 to generate a response 216 to the query 120. This operation can be performed similarly to block 316 of FIG. 3.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by one or more processors of a computing device for causing the computing device to perform operations including:

receiving a query from a user; and based on receiving the query from the user, generating a response to the query by:

transforming the query into a query embedding;

generating, based on the query embedding, a plurality of weighted similarity scores for a plurality of chunk embeddings stored in a vector database, wherein each weighted similarity score of the plurality of weighted similarity scores is computed for a respective chunk embedding of the plurality of chunk embeddings by:

generating a first similarity score for the respective chunk embedding by comparing the query embedding to the respective chunk embedding;

generating a second similarity score for the respective chunk embedding by comparing the query embedding to a contextual data embedding, wherein the contextual data embedding is distinct from and associated with the respective chunk embedding in the vector database; and generating the weighted similarity score for the respective chunk embedding based on the first similarity score and the second similarity score;

selecting at least one chunk embedding from among the plurality of chunk embeddings based on the plurality of weighted similarity scores;

based on selecting the at least one chunk embedding, determining that the at least one chunk embedding corresponds to at least one text document in a document database, wherein the document database is different from the vector database;

based on determining that the at least one chunk embedding corresponds to the at least one text document in the document database, retrieving the at least one text document from the document database;

after retrieving the at least one text document, generating an input for a large language model (LLM) that includes the at least one text document and the query; and executing the LLM based on the input to generate the response to the query.

2. The non-transitory computer-readable medium of claim 1, wherein the contextual data embedding is an embedding of a document summary.

3. The non-transitory computer-readable medium of claim 1, wherein the contextual data embedding is an embedding of a list of document keywords.

4. The non-transitory computer-readable medium of claim 1, wherein the contextual data embedding is an embedding of a document author.

5. The non-transitory computer-readable medium of claim 1, wherein the contextual data embedding is a first contextual data embedding, and wherein a weighted similarity score is generated for a chunk embedding of the plurality of chunk embeddings by:

generating the first similarity score for the chunk embedding by comparing the query embedding to the chunk embedding;

generating a second similarity score for the chunk embedding by comparing the query embedding to the first contextual data embedding, wherein the first contextual data embedding is distinct from and associated with the chunk embedding in the vector database;

generating a third similarity score for the chunk embedding by comparing the query embedding to a second contextual data embedding, wherein second contextual data embedding is distinct from and associated with the chunk embedding in the vector database, and wherein the second contextual data embedding is different from the first contextual data embedding; and generating the weighted similarity score for the chunk embedding based on the first similarity score, the second similarity score, and the third similarity score.

6. The non-transitory computer-readable medium of claim 5, wherein the weighted similarity score is generated by applying different weights to the first similarity score and the second similarity score.

7. The non-transitory computer-readable medium of claim 1, wherein the operations further comprise:

generating the vector database by, for each document among a plurality of text documents:

dividing the document into a set of text chunks;

generating a respective chunk embedding for each text chunk in the set of text chunks;

generating a first contextual data embedding for a first type of metadata about the document;

generating a second contextual data embedding for a second type of metadata about the document; and storing each respective chunk embedding in the vector database, wherein the first contextual data embedding and the second contextual data embedding are also stored in relation to each respective chunk embedding in the vector database.

8. The non-transitory computer-readable medium of claim 1, wherein the operations further comprise:

prior to receiving the query, training the LLM on a training dataset containing textual data to transform the LLM from an untrained state to a trained state.

9. The non-transitory computer-readable medium of claim 1, wherein the operations further comprise:

ranking the plurality of chunk embeddings by the weighted similarity scores, thereby generating a set of ranked chunk embeddings;

selecting the top-X chunk embeddings from among the set of ranked chunk embeddings, wherein X is a predefined numerical value;

retrieving at least two documents associated with the top-X chunk embeddings from the document database; and generating the input for the LLM based on the at least two documents.

10. A method comprising:

receiving, by one or more processors, a query from a user; and based on receiving the query from the user, generating a response to the query by:

transforming, by the one or more processors, the query into a query embedding;

generating, by the one or more processors and based on the query embedding, a plurality of weighted similarity scores for a plurality of chunk embeddings stored in a vector database, wherein each weighted similarity score of the plurality of weighted similarity scores is computed for a respective chunk embedding of the plurality of chunk embeddings by:

generating, by the one or more processors, a first similarity score for the respective chunk embedding by comparing the query embedding to the respective chunk embedding;

generating, by the one or more processors, a second similarity score for the respective chunk embedding by comparing the query embedding to a contextual data embedding, wherein the contextual data embedding is distinct from and associated with the respective chunk embedding in the vector database; and generating, by the one or more processors, the weighted similarity score for the respective chunk embedding based on the first similarity score and the second similarity score;

selecting, by the one or more processors, at least one chunk embedding from among the plurality of chunk embeddings based on the plurality of weighted similarity scores;

based on selecting the at least one chunk embedding, determining, by the one or more processors, that the at least one chunk embedding corresponds to at least one text document;

based on determining that the at least one chunk embedding corresponds to the at least one text document, retrieving, by the one or more processors, the at least one text document;

after retrieving the at least one text document, generating, by the one or more processors, an input for a large language model (LLM) based on the at least one text document and the query; and executing, by the one or more processors, the LLM based on the input to generate the response to the query.

11. The method of claim 10, wherein the contextual data embedding is an embedding of a document summary.

12. The method of claim 10, wherein the contextual data embedding is an embedding of document keywords.

13. The method of claim 10, wherein the contextual data embedding is an embedding of a document author.

14. The method of claim 10, wherein the contextual data embedding is a first contextual data embedding, and further comprising generating a weighted similarity score for a chunk embedding of the plurality of chunk embeddings by:

generating the first similarity score for the chunk embedding by comparing the query embedding to the chunk embedding;

generating a second similarity score for the chunk embedding by comparing the query embedding to the first contextual data embedding, wherein the first contextual data embedding is distinct from and associated with the chunk embedding in the vector database;

generating a third similarity score for the chunk embedding by comparing the query embedding to a second contextual data embedding, wherein second contextual data embedding is distinct from and associated with the chunk embedding in the vector database, and wherein the second contextual data embedding is different from the first contextual data embedding; and generating the weighted similarity score for the chunk embedding based on the first similarity score, the second similarity score, and the third similarity score.

15. The method of claim 14, wherein the weighted similarity score is generated by applying different weights to the first similarity score, the second similarity score, and the third similarity score.

16. The method of claim 10, further comprising:

generating the vector database by, for each document among a plurality of text documents:

dividing the document into a set of text chunks;

generating a respective chunk embedding for each text chunk in the set of text chunks;

generating a first contextual data embedding for a first type of metadata about the document;

generating a second contextual data embedding for a second type of metadata about the document; and storing each respective chunk embedding in the vector database, wherein the first contextual data embedding and the second contextual data embedding are also stored in relation to each respective chunk embedding in the vector database.

17. The method of claim 10, further comprising:

prior to receiving the query, training the LLM on a training dataset containing textual data to transform the LLM from an untrained state to a trained state.

18. The method of claim 10, further comprising:

ranking the plurality of chunk embeddings by the weighted similarity scores, thereby generating a set of ranked chunk embeddings;

selecting the top-X chunk embeddings from among the set of ranked chunk embeddings, wherein X is a predefined numerical value;

retrieving at least two documents associated with the top-X chunk embeddings; and generating the input for the LLM based on the at least two documents.

19. A system comprising:

one or more processors; and one or more memories storing instructions executable by the one or more processors for causing the one or more processors to perform operations including:

transforming a query from a user into a query embedding;

based on the query embedding, generating weighted similarity scores for a plurality of chunk embeddings stored in a vector database, wherein each weighted similarity score is generated by comparing the query embedding to a chunk embedding of the plurality of chunk embeddings and by comparing the query embedding to at least one contextual data embedding associated with the chunk embedding in the vector database;

ranking the plurality of chunk embeddings by the weighted similarity scores, thereby generating a set of ranked chunk embeddings;

selecting the top-X chunk embeddings from among the set of ranked chunk embeddings, wherein X is a predefined numerical value;

retrieving at least two documents associated with the top-X chunk embeddings;

generating an input for a large language model (LLM) based on the at least two documents and the query; and executing the LLM based on the input to generate a response to the query.

20. The system of claim 19, wherein the at least one contextual data embedding includes at least four contextual data embeddings, the at least four contextual data embeddings being associated with at least four different types of document metadata, and wherein the weighted similarity scores are generated by applying at least four different weights to at least four different similarity scores generated based on the at least four contextual data embeddings.

* * * * *